April 8, 1941.    J. L. McCLISH    2,237,838
TRIP MECHANISM FOR TAIL GATES
Filed Aug. 30, 1940    2 Sheets-Sheet 1

Inventor
James L. McClish
By Clarence A. O'Brien
Attorney

April 8, 1941.  J. L. McCLISH  2,237,838
TRIP MECHANISM FOR TAIL GATES
Filed Aug. 30, 1940   2 Sheets-Sheet 2
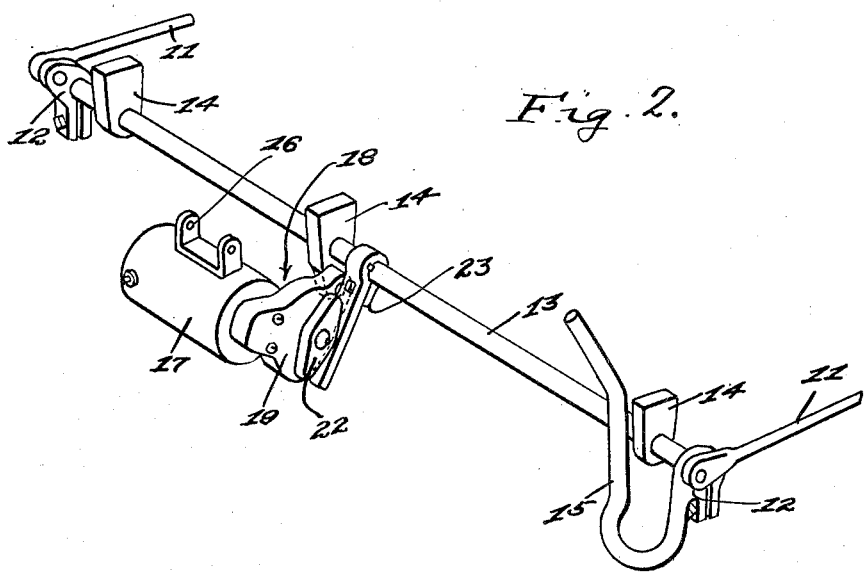
Fig. 2.
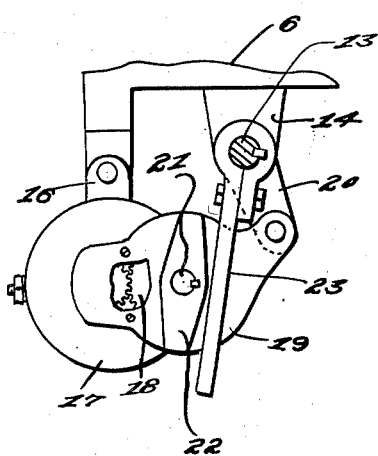
Fig. 3.
Fig. 4.
Inventor
James L. McClish
By Clarence A. O'Brien
Attorney Patented Apr. 8, 1941

2,237,838

UNITED STATES PATENT OFFICE 2,237,838

TRIP MECHANISM FOR TAIL GATES

James L. McClish, Winters, Calif.

Application August 30, 1940, Serial No. 354,880

3 Claims. (Cl. 298—23)

This invention relates to a trip mechanism for tail gates of motor type dump trucks, and has for the primary object the provision of a device of this character which will be positive in action assuring convenient and substantially instantaneous release of the tail gate when actuated from the driver's cab of the truck and may be conveniently operated by a slight foot pressure leaving the driver's hands free for the control of the truck and the body hoisting mechanism thereof.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which Figure 1 is a fragmentary perspective view illustrating a motor type dump truck equipped with a trip mechanism for a tail gate constructed in accordance with my invention.

Figure 2 is a perspective view illustrating the trip mechanism.

Figure 3 is a side elevation, partly in section, illustrating the trip mechanism.

Figure 4 is a diagrammatical view illustrating the wiring diagram for the electric motor constituting part of the trip mechanism.

Figure 5 is a detail sectional view illustrating one of the tail gate latch elements.

Figure 1:
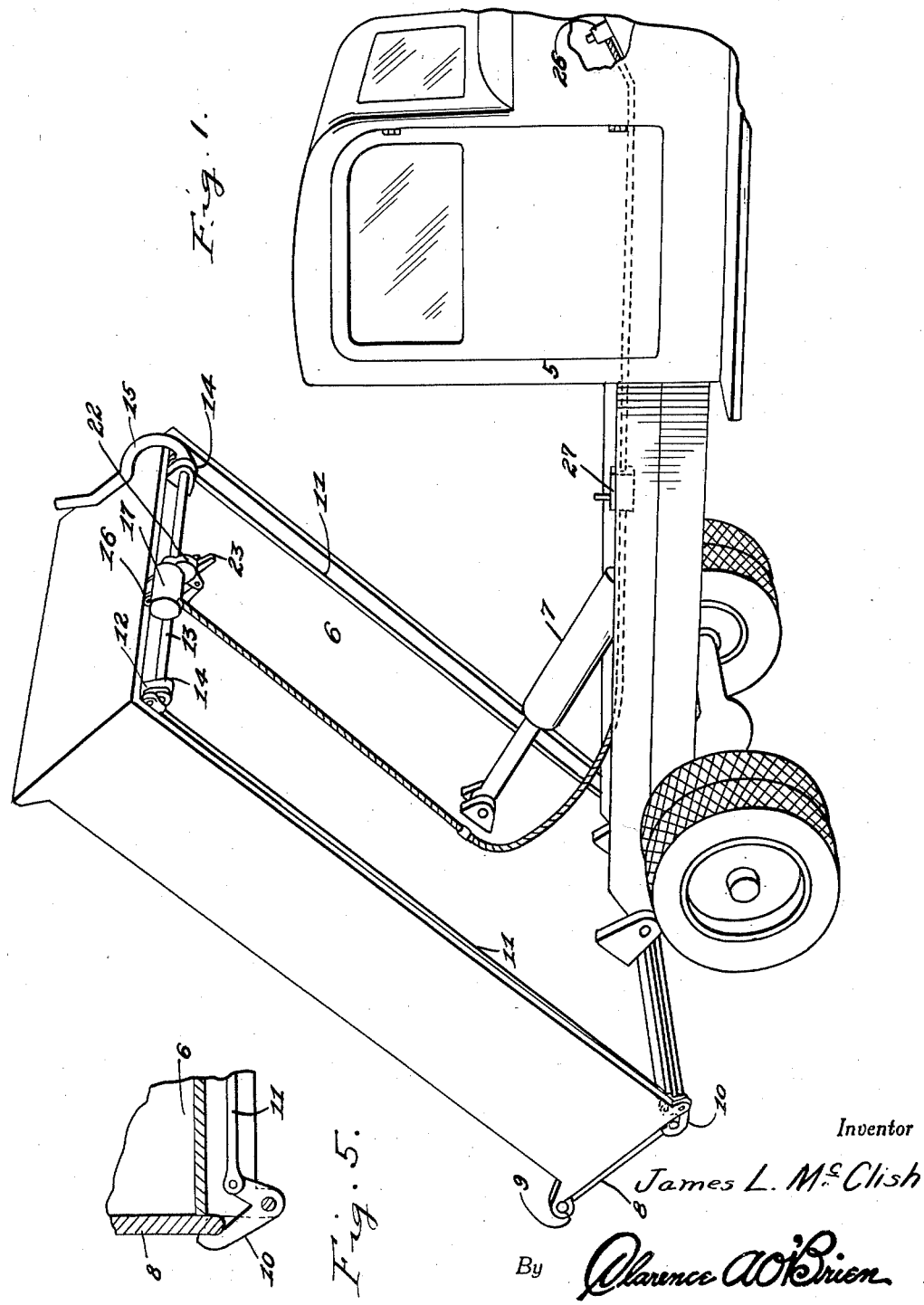

Referring in detail to the drawings, the numeral 5 indicates a conventional type of motor truck having a dump body 6 mounted thereon and actuated into dumping position by a hoist mechanism 7 of a conventional construction which forms no part of the present invention. The dump body 6 includes the usual tail gate 8 pivotally mounted, as shown at 9, and held in a closed position by latch elements 10 moved into releasing position through endwise movement of rods 11 which extend forwardly to the front ends of the body 6. This construction is conventional in a motor truck of the dump body type and to which the present invention is readily adaptable.

The forward ends of the rods 11 are pivotally connected to crank arms or plates 12 secured to the ends of an operating shaft 13 journaled in bearings 14 carried by the forward end of the truck body. The operating shaft 13 extends transversely of the body on the under side thereof adjacent the forward end of said body. One of the crank arms or plates 12 is integral with a lever or handle 15 which may be employed for manually releasing the tail gate.

A hanger 16 is secured to the under side of the truck body adjacent the forward end thereof and supports an electric motor 17, the shaft of which is connected to a reduction gear mechanism 18 mounted in a suitable housing 19. The housing 19 is connected to an extension 20 forming a part of one of the bearings 14. The power takeoff shaft of the reduction gear mechanism 18 is indicated by the character 21 and has keyed or otherwise secured thereto a double ended cam 22. An arm 23 is secured on the operating shaft 13 and lies in the path of movement of the cam 22.

An electric circuit 24, as shown in Figure 4, is electrically connected to the motor 17 and to a battery 25 and also includes in circuit therewith a manually operated switch 26 and a safety switch 27, which, when engaged by the truck body when the latter is in load-carrying position, breaks the circuit 24 and automatically moves into circuit closing position as soon as the body is moved or starts towards an elevated or dumping position. The switch 27 is mounted on the frame of the motor truck, as clearly shown in Figure 1, while the switch 26 is located on the floor or toe boards within the driver's cab of the motor truck so that a pressure thereon by the foot of the operator with the truck body in an elevated or dumping position the electric motor is started in operation. The electric motor drives the cam and the latter imparts movement to the arm 23 which in turn rotates the shaft 13 creating a sliding movement of the rods 11 to actuate the catches 10 into releasing position whereby the gate 8 may swing open under the influence of the load thereagainst. The driver being able to control or close the electric circuit 24 through the operation of the switch 26 by the foot leaves the hands of the operator free to control the truck as well as to control the hoist mechanism 7. As shown in Figure 2, the pivots between rods 11 and the plates 12 are slightly above dead center position when the latches 10 are in tail-gate securing position, so that when the shaft 13 is rotated in a counter clockwise direction by the motor 17, the first movement of said pivots will be downwardly and then forwardly, thus imparting sliding movement to the rods 11 in a direction rearwardly of the body 6 to pivot the latches 10 downwardly into tail-gate releasing position.

While I have shown and described the preferred embodiment of my invention, it will be understood that minor changes in construction, combination and arrangement of parts may be made without departing from the spirit and scope of the invention as claimed.

Having thus described the invention, what I claim is:

1. In combination with a motor dump truck, a dump body therefor having a tail gate and a latch mechanism including an operating shaft and a handle connected thereto, an arm secured to said shaft, and an electric means controlled from the driver's cab of the truck for imparting movement to the arm to release said latch mechanism for freeing the tail gate.

2. In combination with a motor dump truck, a dump body therefor having a tail gate and a latch mechanism including an operating shaft and a handle connected thereto, an arm secured to said shaft, an electric motor mounted on the dump body, a cam driven by said electric motor to engage with said arm to operate the latch mechanism and thereby bring about freeing of the tail gate.

3. In combination with a motor dump truck, a dump body therefor having a tail gate and a latch mechanism including an operating shaft and a handle connected thereto, an arm secured to said shaft, an electric motor mounted on the dump body, a cam driven by said electric motor to engage with said arm to operate the latch mechanism and thereby bring about freeing of the tail gate, an electric circuit for said motor and including a safety switch and a manually operated switch with the latter-named switch located within the driver's cab of the truck and the safety switch located on the truck frame to be engaged by the body when in a load-carrying position to break the circuit and to automatically close the circuit on the body moving into dumping position.

JAMES L. McCLISH.